United States Patent
Zhu et al.

(10) Patent No.: US 12,251,660 B2
(45) Date of Patent: Mar. 18, 2025

(54) HYDROLYSIS REACTION DEVICE FOR DECHLORINATION AND DECYANATION OF BLAST FURNACE GAS

(71) Applicant: Institute of Process Engineering, Chinese Academy of Sciences, Beijing (CN)

(72) Inventors: Tingyu Zhu, Beijing (CN); Yuran Li, Beijing (CN); Bin Wang, Beijing (CN)

(73) Assignee: Institute of Process Engineering, Chinese Academy of Sciences, Beijing (CN)

( * ) Notice: Subject to any disclaimer, the term of this patent is extended or adjusted under 35 U.S.C. 154(b) by 0 days.

(21) Appl. No.: 18/526,464

(22) Filed: Dec. 1, 2023

(65) Prior Publication Data
US 2024/0181389 A1    Jun. 6, 2024

(30) Foreign Application Priority Data
Dec. 5, 2022   (CN) .......................... 202211549750.5

(51) Int. Cl.
*B01D 53/75*   (2006.01)
*B01D 53/04*   (2006.01)
(Continued)

(52) U.S. Cl.
CPC ......... *B01D 53/75* (2013.01); *B01D 53/0423* (2013.01); *B01D 53/48* (2013.01); *B01D 53/685* (2013.01); *B01D 53/82* (2013.01); *B01D 2251/404* (2013.01); *B01D 2251/602* (2013.01); *B01D 2253/102* (2013.01); *B01D 2253/104* (2013.01); *B01D 2253/3425* (2013.01);
(Continued)

(58) Field of Classification Search
None
See application file for complete search history.

(56) References Cited

U.S. PATENT DOCUMENTS 6,284,022 B1    9/2001    Sachweh et al.

FOREIGN PATENT DOCUMENTS

| CN | 111729493 A | 10/2020 |
|----|-------------|---------|
| CN | 111748382 A | 10/2020 |

(Continued)

OTHER PUBLICATIONS

An et al. (CN215209275U)—translated document (Year: 2021).*

(Continued)

*Primary Examiner* — Jelitza M Perez
(74) *Attorney, Agent, or Firm* — Pilloff Passino & Cosenza LLP; Rachel Pilloff; Sean Passino (57) ABSTRACT

Provided is a hydrolysis reaction device for dechlorination and decyanation of blast furnace gas, including a tower body, where a top of the tower body is provided with an air inlet channel, and a bottom of the tower body is provided with an air outlet channel, and functional zones are arranged in the tower body. The functional zones are sequentially an air inlet zone, a first protective agent zone, a first transition zone, a second protective agent zone, a second transition zone, a hydrolysis zone and an air outlet zone along a gas direction, and adjacent functional zones are communicated. Feed holes and discharge holes are uniformly arranged on an outer side surface of the tower body. Gas in a tower radially passes through the protective agent zones and the hydrolysis zone.

19 Claims, 1 Drawing Sheet

(51) Int. Cl.
*B01D 53/48* (2006.01)
*B01D 53/68* (2006.01)
*B01D 53/82* (2006.01)

(52) U.S. Cl.
CPC .. *B01D 2257/2025* (2013.01); *B01D 2257/30* (2013.01); *B01D 2257/408* (2013.01); *B01D 2258/025* (2013.01)

(56) References Cited

FOREIGN PATENT DOCUMENTS

| | | | |
|---|---|---|---|
| CN | 112915777 A | | 6/2021 |
| CN | 215209275 U | * | 12/2021 |
| CN | 114591766 A | | 6/2022 |
| CN | 115261086 A | | 11/2022 |
| WO | 2022110627 A | | 6/2022 |

OTHER PUBLICATIONS

Retrieval report dated Jun. 26, 2024 in SIPO application No. 202211549750.5.
Notification to Grant Patent Right for Invention dated Sep. 13, 2024 in SIPO application No. 202211549750.5.
Notice of first Office action dated Jun. 28, 2024 in SIPO application No. 202211549750.5.

* cited by examiner

HYDROLYSIS REACTION DEVICE FOR DECHLORINATION AND DECYANATION OF BLAST FURNACE GAS

CROSS-REFERENCE TO RELATED APPLICATIONS

This application claims priority to Chinese Patent Application No. 202211549750.5, filed on Dec. 5, 2022, the contents of which are hereby incorporated by reference.

TECHNICAL FIELD

The disclosure belongs to the technical field of blast furnace gas hydrolysis, and relates to a hydrolysis reaction device for dechlorination and decyanation of blast furnace gas.

BACKGROUND

Main Components of blast furnace gas include CO, $CO_2$, $H_2O$, $H_2$, $O_2$, hydrocarbons, $Cl^-$, $CN^-$ and other sulfur-containing components. A total amount of sulfur-containing components is about 150-350 $mg/m^3$, mainly organic sulfur. Organic sulfur has stable properties, thus causing serious corrosion of equipment and pipelines and polluting an atmospheric environment, and is a primary removal object in blast furnace gas desulfurization. Organic sulfur may be removed by direct absorption or indirect conversion. At present, a main removal technology is catalytic conversion of organic sulfur to $H_2S$ indirect removal, which has been applied to desulfurization of blast furnace gas. However, lives of the hydrolyzing agents are not long and conversion efficiency is low. A main reason is that impurities such as $Cl^-$ and $CN^-$ in the blast furnace gas have great toxic effects on the hydrolyzing agents.

CN111729493A discloses a blast furnace gas desulfurization system. A desulfurization agent in an inner cavity of a water tank is discharged downward through a draft tube and a horizontal tube, and lime water and flue gas sprayed by a nozzle are fully desulfurized. Therefore, the system essentially adopts wet desulfurization. The device may not remove organic sulfur, and purification efficiency of inorganic sulfur is not high.

CN111748382A discloses integrated equipment for fine desulfurization of blast furnace gas, which first converts organic sulfur from blast furnace gas into inorganic sulfur, and then removes the inorganic sulfur, with high integration and integrated removal. However, an internal structure of the device is complex, with high pressure drop and low operating flexibility.

A dechlorination and decyanation device of blast furnace gas designed in the current patent is not perfect, with a short lifetime of a hydrolyzing agent and a large system pressure drop, so there is still a lot of room for improvement.

SUMMARY

In view of shortcomings of the prior art, an objective of the disclosure is to provide a hydrolysis reaction device for dechlorination and decyanation of blast furnace gas. In the disclosure, a functional partition hydrolysis reaction device is proposed to make a hydrolysis reaction efficiently, and gas in a tower radially passes through a protective agent zone and a hydrolysis zone. Compared to a traditional axial packing hydrolysis device, the device increases a contact area between the gas and a protective agent and a hydrolyzing agent, and reduces a pressure loss of the device at the same time, and the protective agent and the hydrolyzing agent are fully contacted with the gas, so that a utilization rate is high.

In order to achieve this objective, the disclosure adopts a following technical scheme.

The disclosure provides a hydrolysis reaction device for dechlorination and decyanation of blast furnace gas, including a tower body, where a top of the tower body is provided with an air inlet channel, and a bottom of the tower body is provided with an air outlet channel, and functional zones are arranged in the tower body. The functional zones are sequentially an air inlet zone, a first protective agent zone, a first transition zone, a second protective agent zone, a second transition zone, a hydrolysis zone and an air outlet zone along a gas direction, and adjacent functional zones are communicated. Feed holes and discharge holes are uniformly arranged on an outer side surface of the tower body.

According to the disclosure, the functional partition hydrolysis reaction device is proposed to make a hydrolysis reaction efficiently, and the gas in the tower radially passes through the protective agent zone and the hydrolysis zone. Compared to the traditional axial packing hydrolysis device, the device increases the contact area between the gas and the protective agent and the hydrolyzing agent, and reduces the pressure loss of the device at the same time, and the protective agent and the hydrolyzing agent are fully contacted with the gas, so that the utilization rate is high.

It should be noted that blast furnace gas according to the disclosure enters the device from the air inlet zone at the top, is diverted by a baffle, and then sequentially passes through the first protective agent zone for dechlorination, the second protective agent zone for dechlorination and decyanation or hydrolysis, and a hydrolyzing agent zone for hydrolysis, so that carbonyl sulfur in the gas is converted into hydrogen sulfide and discharged from the air outlet zone at the bottom. Because of special functional zones, impurities in the blast furnace gas are removed first, and then the hydrolysis reaction is carried out, so the utilization rate and a lifetime of the hydrolyzing agent are improved, and the hydrolysis reaction may be carried out efficiently. Moreover, the gas in the tower radially passes through the protective agent zones and the hydrolyzing agent zone, so that compared with the traditional axial packing hydrolysis device, the contact area between the gas and the protective agent and the hydrolyzing agent is increased. Meanwhile, a pressure loss of the device is reduced, and the protective agent and the hydrolyzing agent are fully contacted with the gas, so that the utilization rate is high.

It should be further noted that the disclosure has no special limitation on an overall appearance structure of the hydrolysis reaction device, and those skilled in the art may make adaptive adjustments. The tower body may be cylindrical, and the tower body may be set as a pressure vessel or a non-pressure vessel according to its placement position. If the tower body is set before blast furnace top gas recovery turbine unit/back pressure threshold register (TRT/BPTR) residual pressure power generation, the tower body is a pressure vessel, and if the tower body is set after the TRT/BPTR residual pressure power generation, the tower body is a non-pressure vessel, especially before the TRT/BPTR residual pressure power generation.

In addition, a space ratio of the protective agent and the hydrolyzing agent in the hydrolysis reaction device is high, adaptability to working conditions is good, an operation rate is high, and a pressure drop is small, so that hydrolysis conversion efficiency of the blast furnace gas may be significantly improved, and considerable economic benefits may be achieved.

In an embodiment, the functional zones are coaxially arranged.

It should be noted that a coaxial arrangement of the functional zones limited in the disclosure is due to adapting to different working conditions of the blast furnace gas, ensuring purification efficiency while minimizing a device footprint.

Optionally, a middle of the first protective agent zone, a middle of the second protective agent zone and a middle of the hydrolysis zone are all provided with gas channels.

Optionally, a diameter of the first protective agent zone is smaller than a diameter of the tower body.

Optionally, a diameter of the second protective agent zone is smaller than the diameter of the tower body.

Optionally, a diameter of the hydrolysis zone is smaller than the diameter of the tower body.

Optionally, a gas flow path is formed between an outer surface of the first protective agent zone and an inner wall of the tower body.

Optionally, a gas flow path is formed between an outer surface of the second protective agent zone and the inner wall of the tower body.

Optionally, a gas flow path is formed between an outer surface of the hydrolysis zone and the inner wall of the tower body.

In an embodiment, the discharge holes are provided with at least two.

Optionally, the discharge holes are provided with at least two.

Optionally, the first protective agent zone is provided with the feed holes on an outer surface of the tower body corresponding to one side close to the air inlet zone, and another side of the first protective agent zone is connected with the discharge holes through a pipeline.

Optionally, the second protective agent zone is provided with the feed holes on the outer surface of the tower body corresponding to one side close to the first transition zone, and an other side of the second protective agent zone is connected with the discharge holes through a pipeline.

Optionally, the hydrolysis zone is provided with the feed holes on the outer surface of the tower body corresponding to one side close to the second transition zone, and an other side of the hydrolysis zone is connected with the discharge holes through a pipeline.

In an embodiment, at least one layer of baffle is arranged in the air inlet zone.

It should be noted that a shape, a size and a material of the baffle are not particularly limited in the disclosure, and those skilled in the art may make adaptive adjustments according to an actual situation. Among them, a shape of the baffle may be rectangular, square, etc.

Optionally, at least one baffle vertebra is arranged in the air outlet zone.

It should be noted that a specific structure of the baffle vertebra according to the disclosure may be a cone or a Mitsubishi cone.

In an embodiment, the first protective agent zone is filled with a dechlorination agent.

Optionally, the dechlorination agent is a composite metal oxide dechlorination agent.

According to the disclosure, the dechlorination agent is a composite metal oxide dechlorination agent because the composite metal oxide dechlorination agent has a good dechlorination effect, a long lifetime and a high chlorine capacity.

Optionally, the composite metal oxide dechlorination agent is a calcium oxide-zinc oxide composite dechlorination agent, an aluminum oxide-copper oxide composite dechlorination agent and the like.

Optionally, the dechlorination agent is any one or a combination of two or more of spherical, cylindrical or honeycomb.

In an embodiment, the second protective agent zone is filled with adsorbent.

Optionally, the adsorbent is any one or a combination of two of activated carbon and alumina.

Optionally, the adsorbent is any one or a combination of two or more of spherical, cylindrical or honeycomb.

In an embodiment, the hydrolysis zone is filled with a hydrolyzing agent.

Optionally, the hydrolyzing agent is any one or a combination of two of alumina and zinc oxide.

Optionally, the hydrolyzing agent is any one or a combination of two or more of spherical, cylindrical or honeycomb.

In an embodiment, a diameter ratio of the first protective agent zone, the second protective agent zone and the hydrolysis zone is (0.65-0.85):1:1, and may be, for example, 0.65:1, 0.67:1, 0.68:1, 0.7:1, 0.72:1, 0.74:1, 0.76:1, 0.78:1, 0.8:1, 0.82:1, 0.84:1 and 0.85:1. However, the ratio is not limited to listed values, and other unlisted values within this numerical range are also applicable. Among them, 0.8:1:1 is preferred.

In the disclosure, the diameter ratio of the first protective agent zone, the second protective agent zone and the hydrolysis zone is limited to (0.65-0.85):1:1, in order to balance a flow field of each functional zone and reduce a volume of the tower. If the diameter ratio is not within a numerical range according to the disclosure, resistance of each functional zone may fluctuate greatly, thereby increasing system resistance. An insufficient contact between the blast furnace gas and a protective agent/catalyst of each layer is caused by disorder and imbalance of a pressure field inside the tower.

Optionally, a height ratio of the first protective agent zone, the second protective agent zone and the hydrolysis zone is (0.55-0.75):(0.65-1):1, and may be, for example, 0.55:0.65:1, 0.67:0.68:1, 0.68:0.7:1, 0.7:0.8:1, 0.72:0.9:1, 0.74:0.96:1 and 0.75:1:1. However, the ratio is not limited to listed values, and other unlisted values within this numerical range are also applicable. Among them, 0.75:0.9:1 is further preferred.

In the disclosure, the height ratio of the first protective agent zone, the second protective agent zone and the hydrolysis zone is limited to (0.55-0.75):(0.65-1):1, in order to keep a height of a whole tower and a height-diameter ratio of the tower within a proper range. If the height-diameter is not within a numerical range according to the disclosure, the resistance of each functional zone will increase and a purification effect of the whole tower will be poor.

Optionally, a volume space velocity of the first protective agent zone is 1200-3600 $h^{-1}$, and may be, for example, 1200 $h^{-1}$, 1400 $h^{-1}$, 1600 $h^{-1}$, 1800 $h^{-1}$, 2000 $h^{-1}$, 2300 $h^{-1}$, 2600 $h^{-1}$, 2900 $h^{-1}$, 3000 $h^{-1}$, 3200 $h^{-1}$, 3400 $h^{-1}$, and 3600 $h^{-1}$. However, the ratio is not limited to listed values, and other unlisted values within this numerical range are also applicable.

In the disclosure, the volume space velocity of the first protective agent zone is limited to 1200-3600 $h^{-1}$, because the volume space velocity is determined according to different gas volumes, chloride ion concentration and protective agents with different shapes. If the volume space velocity is not within a numerical range according to the disclosure, a poor chlorine removal effect will be poor, thus resulting a low subsequent COS hydrolysis conversion rate, a severely shortened lifetime and large system resistance. This is because a chlorine removal dose is not matched well.

Optionally, a volume space velocity of the second protective agent zone is 870-3000 $h^{-1}$, and may be, for example, 870 $h^{-1}$, 880 $h^{-1}$, 900 $h^{-1}$, 1000 $h^{-1}$, 1400 $h^{-1}$, 1800 $h^{-1}$, 1900 $h^{-1}$, 2000 $h^{-1}$, 2200 $h^{-1}$, 2400 $h^{-1}$, 2800 $h^{-1}$ and 3000 $h^{-1}$. However, the volume space velocity is not limited to the listed values, and other unlisted values within this numerical range are also applicable.

In the disclosure, the volume space velocity of the second protective agent zone is limited to 870-3000 $h^{-1}$, because the volume space velocity is determined according to different gas volumes, cyanide ion concentration, COS concentration and protective agents with different shapes. If the volume space velocity is not within a numerical range according to the disclosure, a decyanation/hydrolysis effect will be poor, the subsequent COS hydrolysis conversion rate will be low, the lifetime will be seriously shortened, and the system resistance will be large, which is due to mismatch of a second protective agent dose.

Optionally, a volume space velocity of the hydrolysis zone is 550-2500 $h^{-1}$, and may be, for example, 550 $h^{-1}$, 600 $h^{-1}$, 800 $h^{-1}$, 950 $h^{-1}$, 1000 $h^{-1}$, 1200 $h^{-1}$, 1400 $h^{-1}$, 1800 $h^{-1}$, 2000 $h^{-1}$, 2200 $h^{-1}$, 2400 $h^{-1}$, 2500 $h^{-1}$. However, the volume space velocity is not limited to the listed values. Other unlisted values within this numerical range are also applicable.

In the disclosure, the volume space velocity of the hydrolysis zone is limited to 550-2500 $h^{-1}$, because the volume space velocity is determined according to different gas volumes, COS concentration and different protective agents with different shapes. If the volume space velocity is not within a numerical range according to the disclosure, the conversion rate of COS will be seriously reduced, which is due to mismatch of a hydrolyzing agent dose.

In an embodiment, the outer surface of the first protective agent zone is provided with a perforated plate or a partition group.

Optionally, the outer surface of the second protective agent zone is provided with a perforated plate or a partition group.

Optionally, the outer surface of the hydrolysis zone is provided with a perforated plate or a partition group.

Optionally, a diameter of the perforated plate is smaller than a diameter of the dechlorination agent.

Optionally, the diameter of the perforated plate is smaller than a diameter of the adsorbent.

Optionally, the diameter of the perforated plate is smaller than a diameter of the hydrolyzing agent.

Optionally, a porosity of the perforated plate is more than 80%, for example, the porosity may be 81%, 82%, 84%, 86%, 88%, 90%, 92%, 94%, 96%, 98%, etc. However, the porosity is not limited to listed values, and other unlisted values within this numerical range are also applicable.

It should be noted that a material of the perforated plate and shapes and sizes of the holes on the perforated plate are not specifically limited, and those skilled in the art may make adaptive adjustments according to the actual situation. In the disclosure, the porosity of the perforated plate is limited to more than 80% in order to reduce resistance brought by the perforated plate to the system. If the porosity is not within a numerical range according to the disclosure, the system resistance will increase.

Optionally, the partition group includes a plurality of louver partitions.

Optionally, the plurality of louver partitions are staggered to form the partition group.

It should be noted that shapes, sizes and materials of the louver partitions are not particularly limited in the disclosure, and those skilled in the art may make adaptive adjustments according to the actual situation. Among them, the shapes of the louver partitions may be rectangular, square, etc.

It should be noted that a number of "plurality" in the disclosure is not particularly limited, and may be 10, 20, 30, 40, 50 or 60, and a specific application number should be configured according to a size of a whole device, which should be known to those skilled in the art.

In an embodiment, at least one sealing element is arranged on both the air inlet channel and the air outlet channel.

Optionally, the sealing element is a sealing valve.

It should be noted that the sealing element is designed in the disclosure because a gas area cannot be leaked.

Compared with the prior art, the disclosure has following beneficial effects.

According to the disclosure, the functional partition hydrolysis reaction device is proposed to make the hydrolysis reaction efficiently, and the gas in the tower radially passes through the protective agent zone and the hydrolysis zone. Compared to the traditional axial packing hydrolysis device, the device increases the contact area between the gas and the protective agent and the hydrolyzing agent, and reduces the pressure loss of the device at the same time, and the protective agent and the hydrolyzing agent are fully contacted with the gas, so that the utilization rate is high.

DETAILED DESCRIPTION OF THE EMBODIMENTS

Figure 1:
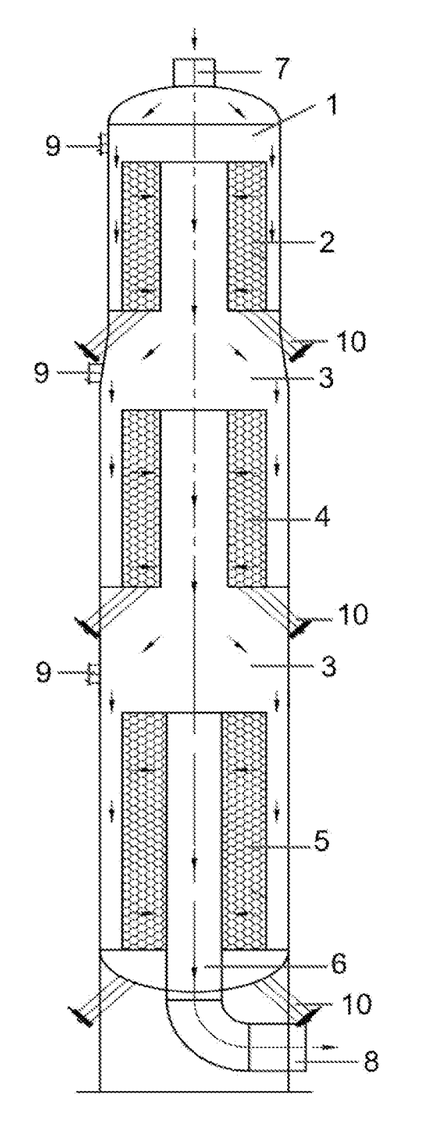
The FIGURE is a schematic structural diagram of a hydrolysis reaction device provided by a specific embodiment of the disclosure.

A technical scheme of the disclosure will be further explained by specific embodiments with attached drawings.

The disclosure provides a hydrolysis reaction device for dechlorination and decyanation of blast furnace gas. As shown in the FIGURE, a hydrolysis reaction device includes a tower body, where a top of the tower body is provided with an air inlet channel 7, and a bottom of the tower body is provided with an air outlet channel 8, and functional zones are arranged in the tower body. The functional zones are sequentially an air inlet zone 1, a first protective agent zone 2, a first transition zone 3, a second protective agent zone 4, a second transition zone, a hydrolysis zone 5 and an air outlet zone 6 along a gas direction, and adjacent functional zones are communicated. Feed holes 9 and discharge holes 10 are uniformly arranged on an outer side surface of the tower body. Further, at least one sealing element is arranged both on the air inlet channel 7 and the air outlet channel 8, and the sealing element is a sealing valve.

In the disclosure, a hydrolysis reaction may be carried out efficiently by providing a functional partition hydrolysis reaction device. Gas in a tower radially passes through protective agent zones and the hydrolysis zone 5. Compared with a traditional axial packing hydrolysis device, a contact area between the gas and a protective agent and the hydrolyzing agent is increased, while a pressure loss of the device is reduced. Moreover, the protective agent and a hydrolyzing agent are fully contacted with the gas, so a utilization rate is high.

It should be noted that blast furnace gas according to the disclosure enters the device from the air inlet zone 1 at the top, is diverted by a baffle, and then sequentially passes through the first protective agent zone for dechlorination, the second protective agent zone for dechlorination and decyanation or hydrolysis, and a hydrolyzing agent zone for hydrolysis, so that carbonyl sulfur in the gas is converted into hydrogen sulfide and discharged from the air outlet zone 6 at the bottom. Because of special functional zones, impurities in the blast furnace gas are removed first, and then the hydrolysis reaction is carried out, which improves the utilization rate and a lifetime of the hydrolyzing agent, so that the hydrolysis reaction may be carried out efficiently. Moreover, the gas in the tower radially passes through the protective agent zones and the hydrolyzing agent zone, so that compared with the traditional axial packing hydrolysis device, the contact area between the gas and the protective agent and the hydrolyzing agent is increased, and a pressure loss of the device is reduced at the same time, and the protective agent and the hydrolyzing agent are fully contacted with the gas, so that the utilization rate is high.

It should be further noted that the disclosure has no special limitation on an overall appearance structure of the hydrolysis reaction device, and those skilled in the art may make adaptive adjustments. The tower body may be cylindrical, and the tower body may be set as a pressure vessel or a non-pressure vessel according to its placement position. If the tower body is set before blast furnace top gas recovery turbine unit (TRT/BPTR) residual pressure power generation, the tower body is a pressure vessel, and if the tower body is set after the TRT/BPTR residual pressure power generation, the tower body is a non-pressure vessel, especially before the TRT/BPTR residual pressure power generation.

In addition, a space ratio of the protective agent and the hydrolyzing agent in the hydrolysis reaction device is high, adaptability to working conditions is good, an operation rate is high, and a pressure drop is small, so that hydrolysis conversion efficiency of the blast furnace gas may be significantly improved, and considerable economic benefits may be achieved.

The functional zones are coaxially arranged, and a middle of the first protective agent zone 2, a middle of the second protective agent zone 4 and a middle of the hydrolysis zone 5 are all provided with gas channels, a diameter of the first protective agent zone 2 is smaller than a diameter of the tower body, a diameter of the second protective agent zone 4 is smaller than the diameter of the tower body, and a diameter of the hydrolysis zone 5 is smaller than the diameter of the tower body. A gas flow path is formed between an outer surface of the first protective agent zone 2 and an inner wall of the tower body, a gas flow path is formed between an outer surface of the second protective agent zone 4 and the inner wall of the tower body, and a gas flow path is formed between an outer surface of the hydrolysis zone 5 and the inner wall of the tower body.

The discharge holes 9 are provided with at least two, and the discharge holes 10 are provided with at least two. The first protective agent zone 2 is provided with the feed holes 9 on an outer surface of the tower body corresponding to one side close to the air inlet zone 1, and an other side of the first protective agent zone 2 is connected with the discharge holes 10 through a pipeline. The second protective agent zone 4 is provided with the feed holes 9 on the outer surface of the tower body corresponding to one side close to the first transition zone 3, and an other side of the second protective agent zone 4 is connected with the discharge holes 10 through a pipeline. The hydrolysis zone 5 is provided with the feed holes 9 on the outer surface of the tower body corresponding to one side close to the second transition zone, and an other side of the hydrolysis zone 5 is connected with the discharge holes 10 through a pipeline.

At least one layer of baffle is arranged in the air inlet zone 1. At least one baffle vertebra is arranged in the air outlet zone 6. It should be noted that a shape, a size and a material of the baffle are not particularly limited in the disclosure, and those skilled in the art may make adaptive adjustments according to an actual situation. Among them, a shape of the baffle may be rectangular, square, etc.

The first protective agent zone is filled with a dechlorination agent. The dechlorination agent is a composite metal oxide dechlorination agent, and the composite metal oxide dechlorination agent is a calcium oxide-zinc oxide dechlorination agent, and the dechlorination agent is any one or a combination of two or more of spherical, cylindrical or honeycomb.

The second protective agent zone is filled with adsorbent. The adsorbent is any one or a combination of two of activated carbon and alumina, and the adsorbent is any one or a combination of two or more of spherical, cylindrical or honeycomb.

The hydrolysis zone 5 is filled with a hydrolyzing agent. The hydrolyzing agent is any one or a combination of two of alumina and zinc oxide, and the hydrolyzing agent is any one or a combination of two or more of spherical, cylindrical or honeycomb.

A diameter ratio of the first protective agent zone 2, the second protective agent zone 4 and the hydrolysis zone 5 is (0.65-0.85):1:1, and may be, for example, 0.65:1, 0.67:1, 0.68:1, 0.7:1, 0.72:1, 0.74:1, 0.76:1, 0.78:1, 0.8:1, 0.82:1, 0.84:1 and 0.85:1. However, the ratio is not limited to listed values, and other unlisted values within this numerical range are also applicable.

A height ratio of the first protective agent zone 2, the second protective agent zone 4 and the hydrolysis zone 5 is (0.55-0.75):(0.65-1):1, and may be, for example, 0.55:0.65:1, 0.67:0.68:1, 0.68:0.7:1, 0.7:0.8:1, 0.72:0.9:1, 0.74:0.96:1 and 0.75:1:1. However, the ratio is not limited to listed values, and other unlisted values within this numerical range are also applicable.

A volume space velocity of the first protective agent zone 2 is 1200-3600 $h^{-1}$, and may be, for example, 1200 $h^{-1}$, 1400 $h^{-1}$, 1600 $h^{-1}$, 1800 $h^{-1}$, 2000 $h^{-1}$, 2300 $h^{-1}$, 2600 $h^{-1}$, 2900 $h^{-1}$, 3000 $h^{-1}$, 3200 $h^{-1}$, 3400 $h^{-1}$, and 3600 $h^{-1}$. However, the ratio is not limited to listed values, and other unlisted values within this numerical range are also applicable.

A volume space velocity of the second protective agent zone 4 is 870-3000 $h^{-1}$, and may be, for example, 870 $h^{-1}$, 880 $h^{-1}$, 900 $h^{-1}$, 1000 $h^{-1}$, 1400 $h^{-1}$, 1800 $h^{-1}$, 1900 $h^{-1}$, 2000 $h^{-1}$, 2200 $h^{-1}$, 2400 $h^{-1}$, 2800 $h^{-1}$ and 3000 $h^{-1}$. However, the volume space velocity is not limited to the listed values, and other unlisted values within this numerical range are also applicable.

A volume space velocity of the hydrolysis zone 5 is 550-2500 $h^{-1}$, and may be, for example, 550 $h^{-1}$, 600 $h^{-1}$, 800 $h^{-1}$, 950 $h^{-1}$, 1000 $h^{-1}$, 1200 $h^{-1}$, 1400 $h^{-1}$, 1800 $h^{-1}$, 2000 $h^{-1}$, 2200 $h^{-1}$, 2400 $h^{-1}$, 2500 $h^{-1}$. However, the volume space velocity is not limited to the listed values. Other unlisted values within this numerical range are also applicable.

The outer surface of the first protective agent zone 2 is provided with a perforated plate or a partition group, the outer surface of the second protective agent zone 4 is provided with a perforated plate or a partition group, and the outer surface of the hydrolysis zone 5 is provided with a perforated plate or a partition group. A diameter of the perforated plate is smaller than a diameter of the dechlorination agent, the diameter of the perforated plate is smaller than a diameter of the adsorbent, and the diameter of the perforated plate is smaller than a diameter of the hydrolyzing agent. A porosity of the perforated plate is more than 80%, for example, the porosity may be 81%, 82%, 84%, 86%, 88%, 90%, 92%, 94%, 96%, 98%, etc. However, the porosity is not limited to listed values, and other unlisted values within this numerical range are also applicable.

It should be noted that a material of the perforated plate and shapes and sizes of the holes on the perforated plate are not specifically limited, and those skilled in the art may make adaptive adjustments according to the actual situation, where the shapes of the holes may be circular, rectangular and the like.

The partition group includes a plurality of louver partitions. The louver partitions are staggered to form the partition group. It should be noted that shapes, sizes and materials of the louver partitions are not particularly limited in the disclosure, and those skilled in the art may make adaptive adjustments according to the actual situation. Among them, the shapes of the louver partitions may be rectangular, square, etc. It should be noted that a number of "plurality" in the disclosure is not particularly limited, and may be 10, 20, 30, 40, 50 or 60, and a specific application number should be configured according to a size of a whole device, which should be known to those skilled in the art.

Embodiment 1

This embodiment provides a hydrolysis reaction device for dechlorination and decyanation of blast furnace gas, where
the hydrolysis reaction device includes a tower body, where a top of the tower body is provided with an air inlet channel 7, and a bottom of the tower body is provided with an air outlet channel 8, and functional zones are arranged in the tower body. The functional zones are sequentially an air inlet zone 1, a first protective agent zone 2, a first transition zone 3, a second protective agent zone 4, a second transition zone, a hydrolysis zone 5 and an air outlet zone 6 along a gas direction, and adjacent functional zones are communicated. Feed holes 9 and discharge holes 10 are uniformly arranged on an outer side surface of the tower body. Further, the air inlet channel 7 and the air outlet channel 8 are respectively provided with a sealing element, and the sealing element is a sealing valve.

The functional zones are coaxially arranged, and a middle of the first protective agent zone 2, a middle of the second protective agent zone 4 and a middle of the hydrolysis zone 5 are all provided with gas channels, a diameter of the first protective agent zone 2 is smaller than a diameter of the tower body, a diameter of the second protective agent zone 4 is smaller than the diameter of the tower body, and a diameter of the hydrolysis zone 5 is smaller than the diameter of the tower body. A gas flow path is formed between an outer surface of the first protective agent zone 2 and an inner wall of the tower body, a gas flow path is formed between an outer surface of the second protective agent zone 4 and the inner wall of the tower body, and a gas flow path is formed between an outer surface of the hydrolysis zone 5 and the inner wall of the tower body.

Two feed holes 9 are provided, and two discharge holes 10 are provided. The first protective agent zone 2 is provided with the feed holes 9 on an outer surface of the tower body corresponding to one side close to the air inlet zone 1, and an other side of the first protective agent zone 2 is connected with the discharge holes 10 through a pipeline. The second protective agent zone 4 is provided with the feed holes 9 on the outer surface of the tower body corresponding to one side close to the first transition zone 3, and an other side of the second protective agent zone 4 is connected with the discharge holes 10 through a pipeline. The hydrolysis zone 5 is provided with the feed holes 9 on the outer surface of the tower body corresponding to one side close to the second transition zone, and an other side of the hydrolysis zone 5 is connected with the discharge holes 10 through a pipeline.

One layer of baffle is arranged in the air inlet zone 1. One baffle vertebra is arranged in the air outlet zone 6.

The first protective agent zone is filled with a dechlorination agent. The dechlorination agent is a composite metal oxide dechlorination agent, and the composite metal oxide dechlorination agent is a calcium oxide-zinc oxide dechlorination agent, and the dechlorination agent is spherical. The second protective agent zone is filled with adsorbent. The adsorbent is activated carbon, and the adsorbent is spherical. The hydrolysis zone 5 is filled with a hydrolyzing agent. The hydrolyzing agent is alumina, and the hydrolyzing agent is spherical.

A diameter ratio of the first protective agent zone 2, the second protective agent zone 4 and the hydrolysis zone 5 is 0.65:1:1. A height ratio of the first protective agent zone 2, the second protective agent zone 4 and the hydrolysis zone 5 is 0.55:0.65:1. A volume space velocity of the first protective agent zone 2 is 1200 $h^{-1}$, a volume space velocity of the second protective agent zone 4 is 870 $h^{-1}$, and a volume space velocity of the hydrolysis zone 5 is 550 $h^{-1}$.

The outer surface of the first protective agent zone 2 is provided with a perforated plate, the outer surface of the second protective agent zone 4 is provided with a perforated plate, and the outer surface of the hydrolysis zone 5 is provided with a perforated plate. A diameter of the perforated plate is smaller than a diameter of the dechlorination agent, the diameter of the perforated plate is smaller than a diameter of the adsorbent, and the diameter of the perforated plate is smaller than a diameter of the hydrolyzing agent. A porosity of the perforated plate is 82%.

Embodiment 2

This embodiment provides a hydrolysis reaction device for dechlorination and decyanation of blast furnace gas, where
the hydrolysis reaction device includes a tower body, where a top of the tower body is provided with an air inlet channel 7, and a bottom of the tower body is provided with an air outlet channel 8, and functional zones are arranged in the tower body. The functional zones are sequentially an air inlet zone 1, a first protective agent zone 2, a first transition zone 3, a second protective agent zone 4, a second transition zone, a hydrolysis zone 5 and an air outlet zone 6 along a gas direction, and adjacent functional zones are communicated. Feed holes 9 and discharge holes 10 are uniformly arranged on an outer side surface of the tower body. Further, the air inlet channel 7 and the air outlet channel 8 are respectively provided with two sealing elements, and the scaling elements are sealing valves.

The functional zones are coaxially arranged, and a middle of the first protective agent zone 2, a middle of the second protective agent zone 4 and a middle of the hydrolysis zone 5 are all provided with gas channels, a diameter of the first protective agent zone 2 is smaller than a diameter of the tower body, a diameter of the second protective agent zone 4 is smaller than the diameter of the tower body, and a diameter of the hydrolysis zone 5 is smaller than the diameter of the tower body. A gas flow path is formed between an outer surface of the first protective agent zone 2 and an inner wall of the tower body, a gas flow path is formed between an outer surface of the second protective agent zone 4 and the inner wall of the tower body, and a gas flow path is formed between an outer surface of the hydrolysis zone 5 and the inner wall of the tower body.

There feed holes 9 are provided, and there discharge holes 10 are provided. The first protective agent zone 2 is provided with the feed holes 9 on an outer surface of the tower body corresponding to one side close to the air inlet zone 1, and an other side of the first protective agent zone 2 is connected with the discharge holes 10 through a pipeline. The second protective agent zone 4 is provided with the feed holes 9 on the outer surface of the tower body corresponding to one side close to the first transition zone 3, and an other side of the second protective agent zone 4 is connected with the discharge holes 10 through a pipeline. The hydrolysis zone 5 is provided with the feed holes 9 on the outer surface of the tower body corresponding to one side close to the second transition zone, and an other side of the hydrolysis zone 5 is connected with the discharge holes 10 through a pipeline.

Two layers of baffles are arranged in the air inlet zone 1. Two baffle vertebrae are arranged in the air outlet zone 6.

The first protective agent zone is filled with a dechlorination agent. The dechlorination agent is a composite metal oxide dechlorination agent, and the composite metal oxide dechlorination agent is a calcium oxide-zinc oxide dechlorination agent, and the dechlorination agent is cylindrical. The second protective agent zone is filled with adsorbent. The adsorbent is activated carbon, and the adsorbent is cylindrical. The hydrolysis zone 5 is filled with a hydrolyzing agent. The hydrolyzing agent is zinc oxide, and the hydrolyzing agent is cylindrical.

A diameter ratio of the first protective agent zone 2, the second protective agent zone 4 and the hydrolysis zone 5 is 0.75:1:1. A height ratio of the first protective agent zone 2, the second protective agent zone 4 and the hydrolysis zone 5 is 0.65:0.8:1. A volume space velocity of the first protective agent zone 2 is 2400 h$^{-1}$, a volume space velocity of the second protective agent zone 4 is 2000 h$^{-1}$, and a volume space velocity of the hydrolysis zone 5 is 1800 h$^{-1}$.

The outer surface of the first protective agent zone 2 is provided with a perforated plate, the outer surface of the second protective agent zone 4 is provided with a perforated plate, and the outer surface of the hydrolysis zone 5 is provided with a perforated plate. A diameter of the perforated plate is smaller than a diameter of the dechlorination agent, the diameter of the perforated plate is smaller than a diameter of the adsorbent, and the diameter of the perforated plate is smaller than a diameter of the hydrolyzing agent. A porosity of the perforated plate is 90%.

Embodiment 3

This embodiment provides a hydrolysis reaction device for dechlorination and decyanation of blast furnace gas, where the hydrolysis reaction device includes a tower body, where a top of the tower body is provided with an air inlet channel 7, and a bottom of the tower body is provided with an air outlet channel 8, and functional zones are arranged in the tower body. The functional zones are sequentially an air inlet zone 1, a first protective agent zone 2, a first transition zone 3, a second protective agent zone 4, a second transition zone, a hydrolysis zone 5 and an air outlet zone 6 along a gas direction, and adjacent functional zones are communicated. Feed holes 9 and discharge holes 10 are uniformly arranged on an outer side surface of the tower body. Further, one sealing element is arranged on the air inlet channel 7 and the air outlet channel 8, and the sealing element is a scaling valve.

The functional zones are coaxially arranged, and a middle of the first protective agent zone 2, a middle of the second protective agent zone 4 and a middle of the hydrolysis zone 5 are all provided with gas channels, a diameter of the first protective agent zone 2 is smaller than a diameter of the tower body, a diameter of the second protective agent zone 4 is smaller than the diameter of the tower body, and a diameter of the hydrolysis zone 5 is smaller than the diameter of the tower body. A gas flow path is formed between an outer surface of the first protective agent zone 2 and an inner wall of the tower body, a gas flow path is formed between an outer surface of the second protective agent zone 4 and the inner wall of the tower body, and a gas flow path is formed between an outer surface of the hydrolysis zone 5 and the inner wall of the tower body.

Four feed holes 9 are provided, and four discharge holes 10 are provided. The first protective agent zone 2 is provided with the feed holes 9 on an outer surface of the tower body corresponding to one side close to the air inlet zone 1, and an other side of the first protective agent zone 2 is connected with the discharge holes 10 through a pipeline. The second protective agent zone 4 is provided with the feed holes 9 on the outer surface of the tower body corresponding to one side close to the first transition zone 3, and an other side of the second protective agent zone 4 is connected with the discharge holes 10 through a pipeline. The hydrolysis zone 5 is provided with the feed holes 9 on the outer surface of the tower body corresponding to one side close to the second transition zone, and an other side of the hydrolysis zone 5 is connected with the discharge holes 10 through a pipeline.

Four layers of baffles are arranged in the air inlet zone 1. Four baffle vertebrae are arranged in the air outlet zone 6.

The first protective agent zone is filled with a dechlorination agent. The dechlorination agent is a composite metal oxide dechlorination agent, and the composite metal oxide dechlorination agent is a calcium oxide-zinc oxide dechlorination agent, and the dechlorination agent is honeycomb. The second protective agent zone is filled with adsorbent. The adsorbent is activated carbon, and the adsorbent is honeycomb. The hydrolysis zone 5 is filled with a hydrolyzing agent. The hydrolyzing agent is aluminum oxide, and the hydrolyzing agent is honeycomb.

A diameter ratio of the first protective agent zone 2, the second protective agent zone 4 and the hydrolysis zone 5 is 0.85:1:1. A height ratio of the first protective agent zone 2, the second protective agent zone 4 and the hydrolysis zone 5 is 0.75:1:1. A volume space velocity of the first protective agent zone 2 is 3600 h$^{-1}$, a volume space velocity of the second protective agent zone 4 is 3000 h$^{-1}$, and a volume space velocity of the hydrolysis zone 5 is 2500 h$^{-1}$.

The outer surface of the first protective agent zone 2 is provided with a partition group, the outer surface of the second protective agent zone 4 is provided with a partition group, and the outer surface of the hydrolysis zone 5 is provided with a partition group. The partition group includes 60 louver partitions, and the 60 louver partitions are staggered to form the partition group.

Embodiment 4

This embodiment provides a hydrolysis reaction device for dechlorination and decyanation of blast furnace gas. Different from Embodiment 1, a diameter ratio of a first protective agent zone 2, a second protective agent zone 4 and a hydrolysis zone 5 is 0.6:1:1, and other parameters and test conditions are the same as those of Embodiment 1.

Embodiment 5

This embodiment provides a hydrolysis reaction device for dechlorination and decyanation of blast furnace gas. Different from Embodiment 1, a diameter ratio of a first protective agent zone 2, a second protective agent zone 4 and a hydrolysis zone 5 is 0.9:1:1, and other parameters and test conditions are the same as those of Embodiment 1.

Embodiment 6

This embodiment provides a hydrolysis reaction device for dechlorination and decyanation of blast furnace gas. Different from Embodiment 1, a height ratio of a first protective agent zone 2, a second protective agent zone 4 and a hydrolysis zone 5 is 0.4:3:1, and other parameters and test conditions are the same as those of Embodiment 1.

Embodiment 7

This embodiment provides a hydrolysis reaction device for dechlorination and decyanation of blast furnace gas. Different from Embodiment 1, a height ratio of a first protective agent zone 2, a second protective agent zone 4 and a hydrolysis zone 5 is 0.8:6:1, and other parameters and test conditions are the same as those of Embodiment 1.

Embodiment 8

This embodiment provides a hydrolysis reaction device for dechlorination and decyanation of blast furnace gas. Different from Embodiment 1, a volume space velocity of a first protective agent zone 2 is 1000 h$^{-1}$, and other parameters and test conditions are the same as Embodiment 1.

Embodiment 9

This embodiment provides a hydrolysis reaction device for dechlorination and decyanation of blast furnace gas. Different from Embodiment 1, a volume space velocity of a first protective agent zone 2 is 3800 h$^{-1}$, and other parameters and test conditions are the same as Embodiment 1.

Embodiment 10

This embodiment provides a hydrolysis reaction device for dechlorination and decyanation of blast furnace gas. Different from Embodiment 1, a volume space velocity of a second protective agent zone 4 is 860 h$^{-1}$, and other parameters and test conditions are the same as Embodiment 1.

Embodiment 11

This embodiment provides a hydrolysis reaction device for dechlorination and decyanation of blast furnace gas. Different from Embodiment 1, a volume space velocity of a second protective agent zone 4 is 3100 h$^{-1}$, and other parameters and test conditions are the same as Embodiment 1.

Embodiment 12

This embodiment provides a hydrolysis reaction device for dechlorination and decyanation of blast furnace gas. Different from Embodiment 1, a volume space velocity of a hydrolysis zone 5 is 500 h$^{-1}$, and other parameters and test conditions are the same as Embodiment 1.

Embodiment 13

This embodiment provides a hydrolysis reaction device for dechlorination and decyanation of blast furnace gas. Different from Embodiment 1, a volume space velocity of a hydrolysis zone 5 is 2600 h$^{-1}$, and other parameters and test conditions are the same as those of Embodiment 1.

Embodiment 14

This embodiment provides a hydrolysis reaction device for dechlorination and decyanation of blast furnace gas. Different from Embodiment 1, a porosity of a perforated plate is 70%, and other parameters and test conditions are the same as Embodiment 1.

Embodiment 15

This embodiment provides a hydrolysis reaction device for dechlorination and decyanation of blast furnace gas. Different from Embodiment 1, a porosity of a perforated plate is 78%, and other parameters and test conditions are the same as Embodiment 1.

Comparative Example 1

This comparative example provides a hydrolysis reaction device for dechlorination and decyanation of blast furnace gas. Different from Embodiment 1, there is no functional zone inside the tower body, and other parameters and test conditions are the same as Embodiment 1.

Dechlorination and decyanation efficiency of the hydrolysis reaction devices in the above embodiments and comparative examples are tested. A specific test method includes: analyzing a concentration of COS before and after hydrolysis by gas chromatography, further calculating hydrolysis conversion efficiency, and testing resistance of a tower by a differential pressure sensor. Results are shown in Table 1 below.

TABLE 1

| Embodiment and Comparative example | Hydrolysis conversion efficiency (%) | Resistance (kPa) |
| --- | --- | --- |
| Embodiment 1 | 98 | 1 |
| Embodiment 2 | 97 | 0.8 |
| Embodiment 3 | 98 | 0.7 |
| Embodiment 4 | 96 | 1.2 |
| Embodiment 5 | 95 | 1.5 |
| Embodiment 6 | 93 | 2 |
| Embodiment 7 | 90 | 2.1 |
| Embodiment 8 | 95 | 1.1 |
| Embodiment 9 | 90 | 1.3 |
| Embodiment 10 | 94 | 1.2 |
| Embodiment 11 | 91 | 1.4 |
| Embodiment 12 | 93 | 1.5 |
| Embodiment 13 | 92 | 1.5 |
| Embodiment 14 | 94 | 2 |
| Embodiment 15 | 90 | 1.5 |
| Comparative example 1 | 55 | 2.8 |

As may be seen from Table 1 above:

by comparing Embodiment 1 with Embodiments 4 and 5, it may be seen that a hydrolysis conversion rate of the hydrolysis reaction device in Embodiment 1 is higher than hydrolysis conversion rates of the hydrolysis reaction devices in Embodiments 4 and 5, and resistance of the hydrolysis reaction device in Embodiment 1 is lower than resistance of the hydrolysis reaction devices in Embodiments 4 and 5. This is because the disclosure limits the diameter ratio of the first protective agent zone 2, the second protective agent zone 4, and the hydrolysis zone 5 to (0.65-0.85):1:1, resulting in a balanced flow field in the tower, low resistance, uniform and stable passage of blast furnace gas through a catalyst layer, and a high catalyst utilization rate.

By comparing Embodiment 1 with Embodiments 6 and 7, it may be seen that the hydrolysis conversion rate of the hydrolysis reaction device in Embodiment 1 is higher than hydrolysis conversion rates of the hydrolysis reaction devices in Embodiments 6 and 7, and the resistance of the hydrolysis reaction device in Embodiment 1 is lower than resistance of the hydrolysis reaction devices in Embodiments 6 and 7. This is because the disclosure limits the height ratio of the first protective agent zone 2, the second protective agent zone 4, and the hydrolysis zone 5 to (0.55-0.75):(0.65-1):1, allowing a suitable contact time between the blast furnace gas and the protective agent/catalyst layer of each functional zone without being too long or too short, thus facilitating a full utilization of the catalyst and reducing tower resistance.

By comparing Embodiment 1 with Embodiments 8 and 9, it may be seen that the hydrolysis conversion rate of the hydrolysis reaction device in Embodiment 1 is higher than hydrolysis conversion rates of the hydrolysis reaction devices in Embodiments 8 and 9, and the resistance of the hydrolysis reaction device in Embodiment 1 is lower than resistance of the hydrolysis reaction device in Embodiment 8. This is because the disclosure ensures a chlorine removal effect by limiting the volume space velocity of the first protective agent zone 2 to 1200-3600 $h^{-1}$, thereby affecting a subsequent COS hydrolysis conversion rate and system resistance.

By comparing Embodiment 1 with Embodiments 10 and 11, it may be seen that the hydrolysis conversion rate of the hydrolysis reaction device in Embodiment 1 is higher than hydrolysis conversion rates of the hydrolysis reaction devices in Embodiments 10 and 11, and the resistance of the hydrolysis reaction device in Embodiment 1 is lower than resistance of the hydrolysis reaction device in Embodiment 10. This is because the disclosure ensures a decyanation/hydrolysis effect by limiting the volume space velocity of the second protective agent zone 4 to 870-3000 $h^{-1}$, thereby affecting the subsequent COS hydrolysis conversion rate and the system resistance.

By comparing Embodiment 1 with Embodiments 12 and 13, it may be seen that the hydrolysis conversion rate of the hydrolysis reaction device in Embodiment 1 is higher than hydrolysis conversion rates of the hydrolysis reaction devices in Embodiments 12 and 13, and the resistance of the hydrolysis reaction device in Embodiment 1 is lower than resistance of the hydrolysis reaction device in Embodiment 12. This is because the disclosure ensures the COS conversion rate and reduces the system resistance by limiting the volume space velocity of the hydrolysis zone 5 to 550-2500 $h^{-1}$.

By comparing Embodiment 1 with Embodiments 14 and 15, it may be seen that the hydrolysis conversion rate of the hydrolysis reaction device in Embodiment 1 is higher than hydrolysis conversion rates of the hydrolysis reaction devices in Embodiments 14 and 15, and the resistance of the hydrolysis reaction device in Embodiment 1 is lower than resistance of the hydrolysis reaction devices in in Embodiments 14 and 15. This is because the disclosure limits the porosity of the perforated plate to >80%, resulting in low system resistance, the balanced flow field inside the tower, the uniform and stable passage of blast furnace gas through the catalyst layer, and the high catalyst utilization rate.

By comparing Embodiment 1 with Comparative example 1, it may be seen that the hydrolysis conversion rate of the hydrolysis reaction device in Embodiment 1 is higher than a hydrolysis conversion rate of the hydrolysis reaction device in Comparative example 1, and the resistance of the hydrolysis reaction device in Embodiment 1 is lower than resistance of the hydrolysis reaction device in in Comparative example 1. This is because the disclosure reduces side reactions by setting different functional zones inside the tower body, allowing the hydrolysis reaction to proceed smoothly with minimal interference and improved conversion rate. At the same time, the functional zones may balance the flow field inside the tower and reduce a system pressure loss.

Above are only specific embodiments of the disclosure, but a protection scope of the disclosure is not limited to this. It should be clear to those skilled in the technical field that any change or replacement that may be easily thought of by those skilled in a technical field within a technical scope disclosed by the disclosure falls within the protection scope and a disclosure scope of the disclosure.

What is claimed is:

1. A hydrolysis reaction device for dechlorination and decyanation of blast furnace gas, wherein the hydrolysis reaction device comprises a cylinder body, wherein a top of the cylinder body is provided with an air inlet channel, and a bottom of the cylinder body is provided with an air outlet channel, and functional zones are arranged in the cylinder body; the functional zones are sequentially an air inlet zone, a first protective agent zone, a first transition zone, a second protective agent zone, a second transition zone, a hydrolysis zone and an air outlet zone along a gas flow direction, and adjacent functional zones are communicated; and feed holes and discharge holes are uniformly arranged on an outer side surface of the cylinder body;

wherein the first protective agent zone is filled with a dechlorination agent; the dechlorination agent is a composite metal oxide dechlorination agent; the composite metal oxide dechlorination agent is a calcium oxide-zinc oxide composite dechlorination agent or an aluminum oxide-copper oxide composite dechlorination agent; and the dechlorination agent is any one or a combination of two or more of spherical, cylindrical or honeycomb;

wherein the second protective agent zone is filled with adsorbent; the adsorbent is any one or a combination of two of activated carbon and alumina; and the adsorbent is any one or a combination of two or more of spherical, cylindrical or honeycomb;

wherein the hydrolysis zone is filled with a hydrolyzing agent; the hydrolyzing agent is any one or a combination of two of alumina and zinc oxide; and the hydrolyzing agent is any one or a combination of two or more of spherical, cylindrical or honeycomb; and wherein a diameter ratio of the first protective agent zone, the second protective agent zone and the hydrolysis zone is (0.65-0.85):1:1, a height ratio of the first protective agent zone, the second protective agent zone and the hydrolysis zone is (0.55-0.75):(0.65-1):1, a volume space velocity of the first protective agent zone is 1200-3600 $h^{-1}$, a volume space velocity of the second protective agent zone is 870-3000 $h^{-1}$, and a volume space velocity of the hydrolysis zone is 550-2500 $h^{-1}$.

2. The hydrolysis reaction device according to claim 1, wherein the functional zones are coaxially arranged.

3. The hydrolysis reaction device according to claim 1, wherein a middle of the first protective agent zone, a middle of the second protective agent zone and a middle of the hydrolysis zone are all provided with gas channels.

4. The hydrolysis reaction device according to claim 1, wherein a gas flow path is formed between an outer surface of the first protective agent zone and an inner wall of the cylinder body.

5. The hydrolysis reaction device according to claim 1, wherein a gas flow path is formed between an outer surface of the second protective agent zone and an inner wall of the cylinder body.

6. The hydrolysis reaction device according to claim 1, wherein a gas flow path is formed between an outer surface of the hydrolysis zone and an inner wall of the cylinder body.

7. The hydrolysis reaction device according to claim 1, wherein a number of the feed holes is at least two.

8. The hydrolysis reaction device according to claim 1, wherein a number of the discharge holes is at least two.

9. The hydrolysis reaction device according to claim 1, wherein the first protective agent zone is provided with the feed holes on an outer surface of the cylinder body corresponding to one side close to the air inlet zone, and an other side of the first protective agent zone is connected with the discharge holes through a pipeline.

10. The hydrolysis reaction device according to claim 1, wherein the second protective agent zone is provided with the feed holes on an outer surface of the cylinder body corresponding to one side close to the first transition zone, and an other side of the second protective agent zone is connected with the discharge holes through a pipeline.

11. The hydrolysis reaction device according to claim 1, wherein the hydrolysis zone is provided with the feed holes on an outer surface of the cylinder body corresponding to one side close to the second transition zone, and an other side of the hydrolysis zone is connected with the discharge holes through a pipeline.

12. The hydrolysis reaction device according to claim 1, wherein an outer surface of the first protective agent zone is provided with a perforated plate or a partition group.

13. The hydrolysis reaction device according to claim 12, wherein an outer surface of the second protective agent zone is provided with a perforated plate or a partition group.

14. The hydrolysis reaction device according to claim 13, wherein an outer surface of the hydrolysis zone is provided with a perforated plate or a partition group.

15. The hydrolysis reaction device according to claim 12, wherein a diameter of the perforated plate is smaller than a diameter of the dechlorination agent.

16. The hydrolysis reaction device according to claim 13, wherein a diameter of the perforated plate is smaller than a diameter of the adsorbent.

17. The hydrolysis reaction device according to claim 14, wherein a diameter of the perforated plate is smaller than a diameter of the hydrolyzing agent.

18. The hydrolysis reaction device according to claim 1, wherein both the air inlet channel and the air outlet channel are provided with at least one sealing element.

19. The hydrolysis reaction device according to claim 18, wherein the sealing element is a sealing valve.

\* \* \* \* \*